United States Patent
Nadeau et al.

(10) Patent No.: US 8,160,055 B1
(45) Date of Patent: Apr. 17, 2012

(54) SYSTEM AND METHODS FOR IDENTIFYING NETWORK PATH PERFORMANCE

(75) Inventors: Thomas D. Nadeau, Hampton, NH (US); Monique Jeanne Morrow, Zuerich (CH); W. Mark Townsley, Pensacola, FL (US); James N. Guichard, Groton, MA (US); George Leonard Swallow, Boston, MA (US)

(73) Assignee: Cisco Technology, Inc., San Jose, CA (US)

( * ) Notice: Subject to any disclaimer, the term of this patent is extended or adjusted under 35 U.S.C. 154(b) by 992 days.

(21) Appl. No.: 11/361,299

(22) Filed: Feb. 24, 2006

(51) Int. Cl.
*H04L 12/28* (2006.01)
*H04L 12/66* (2006.01)
*H04L 12/26* (2006.01)
*H04L 1/00* (2006.01)
*H04J 3/14* (2006.01)
*H04J 1/16* (2006.01)

(52) U.S. Cl. ........ 370/351; 370/352; 370/229; 370/230; 370/231

(58) Field of Classification Search .................. 370/248, 370/241, 229, 230, 230.1, 231, 351, 352, 370/392; 340/853.1, 853.2; 379/1.01; 709/238, 709/239
See application file for complete search history.

(56) References Cited

U.S. PATENT DOCUMENTS

| | | | |
|---|---|---|---|
| 7,558,194 B2* | 7/2009 | Regan et al. ................... | 370/217 |
| 2002/0150041 A1* | 10/2002 | Reinshmidt et al. .......... | 370/216 |
| 2004/0233891 A1* | 11/2004 | Regan et al. ................... | 370/351 |
| 2005/0108379 A1* | 5/2005 | Gray et al. ..................... | 709/223 |
| 2005/0207410 A1* | 9/2005 | Adhikari et al. ............... | 370/389 |
| 2005/0220033 A1* | 10/2005 | DelRegno et al. ............. | 370/249 |
| 2006/0072543 A1* | 4/2006 | Lloyd et al. ................... | 370/351 |
| 2006/0182122 A1* | 8/2006 | Davie et al. .............. | 370/395.53 |
| 2006/0187819 A1* | 8/2006 | Bryant et al. ................. | 370/216 |

* cited by examiner

*Primary Examiner* — Kwang B Yao
*Assistant Examiner* — Adam Duda
(74) *Attorney, Agent, or Firm* — Brinks Hofer Gilson & Lione

(57) ABSTRACT

A pseudowire verification framework gathers and maintains status of individual pseudowires by aggregating the state of the individual node hops defining the pseudowire. The framework provides complete assessment of a network by gathering status feedback from network nodes (forwarding entities) that are inaccessible directly from a requesting node by employing an intermediate forwarding entity as a proxy for inquiring on behalf of the requesting node. Therefore, status regarding inaccessible pseudowires is obtainable indirectly from nodes able to "see" the particular pseudowire. Configurations further assess multihop pseudowires including a plurality of network segments; in which each segment defines a pseudowire hop including forwarding entities along the pseudowire path. In this manner, pseudowire health and status is gathered and interrogated for nodes (forwarding) entities unable to directly query the subject pseudowire via intermediate forwarding entities.

22 Claims, 7 Drawing Sheets

SYSTEM AND METHODS FOR IDENTIFYING NETWORK PATH PERFORMANCE

BACKGROUND

In a Virtual Private Networking (VPN) environment, a business or enterprise connects multiple remote sites, such as Local Area Networks (LANs) or other subnetwork as an integrated virtual entity that provides seamless security and transport such that each user appears local to each other user. In a conventional VPN, subnetworks interconnect via one or more common public access networks operated by a service provider. Such a subnetwork interconnection is typically known as a core network, and includes service providers having a high-speed backbone of routers and trunk lines. Each of the subnetworks and the core network has entry points known as edge routers, through which traffic ingressing and egressing from the network travels. The core network has ingress/egress points handled by nodes known as provider edge (PE) routers, while the subnetworks have ingress/egress points known as customer edge (CE) routers, discussed further in Internet Engineering Task Force (IETF) RFC 2547bis, concerning Virtual Private Networks (VPNs).

An interconnection between the subnetworks of a VPN, therefore, typically includes one or more core networks. Each of the core networks is usually one or many autonomous systems (AS), meaning that it employs and enforces a common routing policy among the nodes (routers) included therein. Accordingly, the nodes of the core networks often employ a protocol operable to provide high-volume transport with path based routing, meaning that the protocol not only specifies a destination (as in TCP/IP), but rather implements an addressing strategy that allows for unique identification of end points, and also allows specification of a particular routing path through the core network. One such protocol is the Multiprotocol Label Switching (MPLS) protocol, defined in Internet Engineering Task Force (IETF) RFC 3031. MPLS is a protocol that combines the label-based forwarding of ATM networks with the packet-based forwarding of IP networks, and builds applications upon this infrastructure.

Traditional MPLS, and more recently Generalized MPLS (G-MPLS) networks as well, extend the suite of IP protocols to expedite the forwarding scheme used by conventional IP routers, particularly through core networks employed by service providers (as opposed to end-user connections or taps). Conventional routers typically employ complex and time-consuming route lookups and address matching schemes to determine the next hop for a received packet, primarily by examining the destination address in the header of the packet. MPLS simplifies this operation by basing the forwarding decision on a simple label, via a so-called Label Switched Router (LSR) mechanism. Therefore, another major feature of MPLS is its ability to place IP traffic on a particular defined path through the network as specified by the label. Such path specification capability is generally not available with conventional IP traffic. In this way, MPLS provides bandwidth guarantees and other differentiated service features for a specific user application (or flow). Current IP-based MPLS networks (IP/MPLS) are emerging for providing advanced services such as bandwidth-based guaranteed service (i.e. Quality of Service, or QOS), priority-based bandwidth allocation, and preemption services.

SUMMARY

In a VPN networking environment, IP/MPLS may be employed for providing infrastructure convergence among various conventional transports and tunneling technologies commonly employed in VPN MPLS networks. One of the first aspects of infrastructure convergence is for a carrier to consolidate typical traffic types, including primarily ATM, Frame Relay, Point-to-Point Protocol (PPP), High-Level Data Link Control (HDLC), and EthernetNLANs under a unified backbone technology and provide transport services for these at Layer 2 to maintain service transparency to its end customers. Increasingly, IP/MPLS is becoming the core transport medium of choice, although other Layer 2 tunneling technologies such as Layer 2 Tunneling Protocol Version 3 (L2TPv3) can also be used. IP/MPLS allows the carrier to use some of the strengths of MPLS, such as the connection-oriented infrastructure, Traffic Engineering capabilities, and network-resiliency features such as Fast Reroute (FRR) for transport of Layer 2 traffic, while maintaining the existing hub-and-spoke topologies of enterprise WANs.

This transport is achieved by building point-to-point tunnels across the core IP/MPLS network between the provider-edge devices that interlink the customer-edge devices that need to communicate through the Layer 2 access protocols. This Layer 2 tunnel is commonly referred to as a pseudowire and is a specific instantiation of a Layer 2 VPN type referred to as Virtual Private Wire Service (VPWS). The corresponding provider-edge to customer-edge link or the attachment circuit and the Layer 2 protocol type that is carried over the pseudowire is often generically labeled as the Pseudowire Emulated Service (PWES). It is also possible to create Virtual Private LAN Service (VPLS) and Hierarchical VPLS (H-VPLS) networks by connecting these point-to-point VPWS constructs together at a virtual bridging instance. Pseudowires have the capability to extend the unit of connectivity across multiple routers via a label switched path (LSP). A label switched path specifies not only a destination, but also specific routes (router nodes) along a path, thus simplifying routing decisions at each individual hop. Put another way, the label switched path raises the level of granularity, or atomicity, of the conventional IP routing hop from a single router to an entire path through the network. This path includes multiple routers (i.e. "hops") and other switching entities, and typically spans the PE-PE connection over the core network, though may represent other device-to-device paths as well.

In a computer network such as an MPLS network, pseudowires are employed to provide a message traffic transport medium along a predetermined path between specific forwarding entities (FEs), typically routers. The pseudowires define a path between pluralities of node hops at each of the intermediate forwarding entities defining the endpoints of the pseudowire. Routing determinations at each of the intermediate forwarding entities (FEs) may be performed by a fast access protocol such as Label Switched Path (LSP) routing, therefore avoiding individual route decisions at each intermediate node hop.

In a typical VPN, each subnetwork has one or more gateway nodes, or customer equipment (CE) routers, through which traffic egressing and ingressing to and from other subnetworks passes. The gateway nodes connect to a network provider router, or provider equipment (PE), at the edge of a core network operable to provide transport to the other subnetworks in the VPN. The CE and PE routers are sometimes referred to as "edge" routers due to their proximity on the edge of a customer or provider network. The core network, which may be a public access network such as the Internet, a physically separate intranet, or other interconnection, provides transport to a remote PE router. The remote PE router couples to a remote CE router representing the ingress to a remote subnetwork, or LAN, which is part of the VPN. The remote CE router performs forwarding of the message traffic on to the destination within the remote VPN (LAN) subnetwork.

In a conventional VPN having subnetworks interconnected by a core network, customer edge (CE) routers serving a VPN LAN are not privy to connectivity and path attribute information within the core network. A conventional CE router, therefore, is unable to interrogate the core network for determining connectivity (i.e. availability) of a particular path, or path attributes for determining, for example, whether a particular QoS level is supportable on a particular link or via a particular route. Accordingly, a conventional local CE router is unable to determine availability of, or determine transmission attributes to, a remote VPN location (destination). Therefore, determination of paths that satisfy a QoS or other delivery speed/bandwidth guarantee may be difficult or unavailable in a conventional CE router. Accordingly, it can be problematic to perform routing decisions for QoS based traffic. Further, such QoS levels and related attributes may become contractual terms between service providers and customers. In particular, in L3 VPN MPLS networks, path QoS (relating to attributes such as path bandwidth, jitter, delay and loss) often pertains to a service level agreement (SLA) that a provider typically sells to a customer as a contract for service.

In such conventional MPLS networks, it is beneficial to provide a mechanism for allowing nodes in the core network to compute and relay network health and connectivity information back to the CE routers unable to obtain such information directly. Such a mechanism allows different segments to act as proxies for other segments in order to allow for complete end-to-end path measurements.

One mechanism for performing such verification is disclosed in copending U.S. patent application Ser. No. 11/135,253, filed May 23, 2005, entitled "SYSTEM AND METHODS FOR PROVIDING A NETWORK PATH VERIFICATION PROTOCOL", incorporated herein by reference in entirety. However, conventional assessment of network health and connectivity typically employs individual node-to-node hops as the unit of granularity around which connectivity metrics are computed. Pseudowires typically span multiple individual node hops using the layer 2 tunneling approach discussed above. Accordingly, it would be beneficial to extend the path verification mechanism to a pseudowire level of granularity to allow connectivity and health metrics to encompass an entire pseudowire status rather than, for example individual node hopes through which the pseudowire necessarily passes.

Configurations of the invention are based, in part, on the observation that, along a pseudowire, performance is limited by the operation of the most burdened, or least efficient, node hop. Further, in a service provider network, pseudowires may span multiple autonomous systems (AS s), each operated by a separate service provider, in a so-called multi-hop pseudowire. Accordingly, it may be difficulty to assess the health (status) of an entire pseudowire due either to a large number of intermediate nodes or to accessibility of pseudowires spanning multiple autonomous systems (AS s). Therefore routing decisions and assessments, such as which pseudowire to employ or what performance may be expected on a particular pseudowire may be difficult to compute. Requirements dictated by service level agreements (SLAs) and/or Quality of service (QOS) expectations may be difficult to meet and verify.

Accordingly, configurations discussed herein substantially overcome the above described shortcomings of pseudowire health and status computations by providing a pseudowire verification framework which gathers and maintains status of individual pseudowires by aggregating the state of the individual node hops defining the pseudowire. Further, the framework provides complete assessment of a network by gathering status feedback from network nodes (forwarding entities) that are inaccessible directly from a requesting node by employing an intermediate forwarding entity as a proxy for inquiring on behalf of the requesting node. Therefore, status regarding inaccessible pseudowires is obtainable indirectly from nodes able to "see" the particular pseudowire. In this manner, pseudowire health and status is gathered and interrogated for nodes (forwarding) entities unable to directly query the subject pseudowire via intermediate forwarding entities. The disclosed approach therefore provides a generalized verification protocol applicable to pseudowires having an approach similar to that employed for individual nodes in copending U.S. patent application Ser. No. 11/135,253 cited above.

Such a node hop therefore, defines the unit of connectivity about which a conventional status determination (i.e. availability, speed, throughput, error rate) may be established. The hops define the points at which routing decisions are made. In the case of the pseudowire, each node hop therefore determines the destination router and path at the end of the pseudowire. Routing decisions are not performed at each intermediate router because the label denoting the label switched path to the destination router predetermines the path to the destination router.

In a typical VPN arrangement, a particular end-to-end path between a VPN source, or originator, and a VPN destination, or recipient represents a plurality of segments. Each segment is a set of one or more node hops between certain nodes along the path. A plurality of segments represents a path, and include the local CE segment from the local CE router to the core network, the core segment between the PE routers of the core network, and the remote CE segment from the remote PE router to the remote CE router, as will be discussed further below. Other segments may be defined. In further detail the method of classifying paths in a network having a plurality of forwarding entities operable to transmit message traffic from a particular forwarding entity to another forwarding entity via a path including at least one additional forwarding entity includes identifying a pseudowire between a source forwarding entity and a destination forwarding entity, the pseudowire defining at least a portion of the path, and sending a probe message to at least one of the forwarding entities on the path. Subsequently, the requestor receives a response message indicative of the health of the pseudowire, in which the health of the pseudowire is collectively defined by the reachability of each of the forwarding entities on the path defined by the pseudowire. The pseudowire includes at least one intermediate forwarding entity operable for switching message traffic according to a label, such that the label is indicative of a particular route through the network. The network includes a plurality of interconnected pseudowires, such that each of the pseudowires defines a pseudowire hop across a respective core network, in which each of the core networks defines an autonomous system has a routing policy independent of the other autonomous systems traversed by the interconnected pseudowires.

In the exemplary configuration, the source forwarding entity and the destination forwarding entity are provider edge routers defining a core network, the pseudowire traversing the core network between them. A pseudowire manager identifies characteristics of the pseudowire, such that the pseudowire has a collective status across each of the intermediate forwarding entities therein, in which each of the intermediate forwarding entities are operable to transmit message traffic according to a common label (i.e. LSP route).

The pseudowire manager sends the probe message from a requesting forwarding entity, in which at least one of the forwarding entities on the pseudowire is unavailable directly from the requesting forwarding entity. In the exemplary arrangement, the requestor sends the probe message to a provider edge router defining the edge of one of the core networks. The pseudowire further includes a plurality of node hops between each of the intermediate forwarding entities. Accordingly, gathering pseudowire information includes identifying a pseudowire having a plurality of node hops, and sending a first probe message to a forwarding entity of a particular node hop. The pseudowire manager then sends successive probe messages inquisitive of availability of other node hops, such that the successive probe messages are sent from the forwarding entity receiving the first probe message.

Status logic gathers statistics about the status of the pseudowire, in which the statistics include a set of attributes for each node hop in the pseudowire, such that the health of the pseudowire includes determining the health of each of the node hops defining the pseudowire. The pseudowire therefore defines a path from each intermediate forwarding entity to a successive intermediate forwarding entity such that the pseudowire node hops further comprise a predetermined path between a plurality of forwarding entities, further comprising computing a path status indicative of connectivity among each of the forwarding entities in the pseudowire. Each of the node hops included in a pseudowire is operable for routing via a label indicative of specific forwarding entities along the pseudowire, such as an LSP label. Accordingly, the pseudowires are operable to encapsulate message traffic in layer 2 packets operable for tunneling via the pseudowire, the pseudowire defining the routing path at each intermediate forwarding entity.

The multihop pseudowires further include a plurality of segments, in which each segment defining a pseudowire hop in the pseudowire. For each segment in the plurality of segments, the probe manager sends a probe message to at least one forwarding entity in the segment, in which the segment includes a sequence of forwarding entities along the path.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
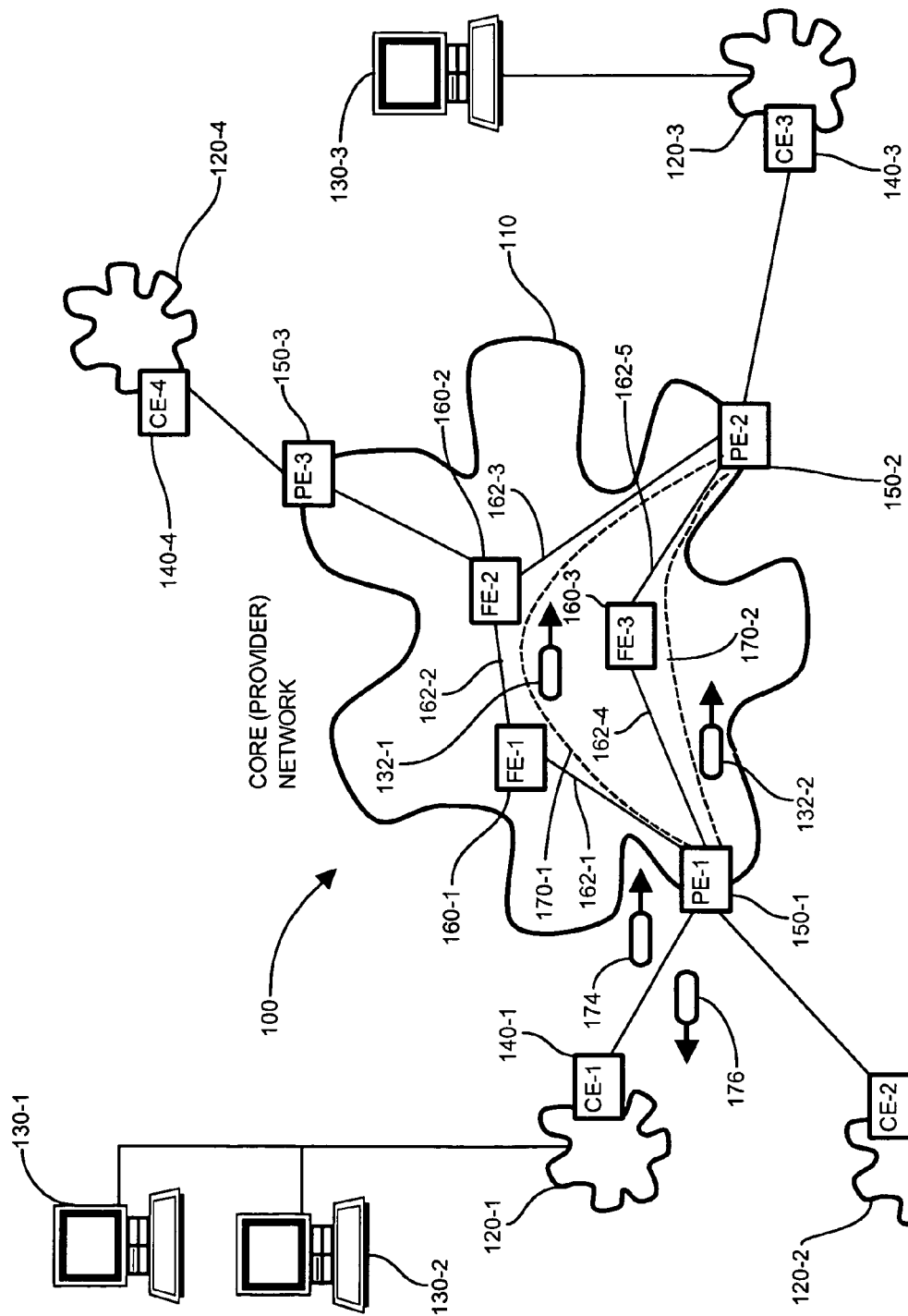
FIG. 1 is a context diagram of a network communications environment depicting a networking environment including pseudowires operable.

In a conventional managed information environment, such as a service provider core network interconnecting local area networks (subnetworks) and corresponding end users, pseudowires provide a virtual connection between edge routers defining the edges of the core network. A plurality of pseudowires may be established between the edge routers, therefore providing an infrastructure for efficient traversal of the core network by user message traffic. The pseudowires enable a native service, such as ATM, Frame Relay, Ethernet and others for emulation over the core network operable with IP, MPLS, or L2TP3 (Layer 2 Tunneling protocol Version 3).

In a large system having multiple service providers, each service provider may provide a portion, or core network, of the PSN, in a so-called multi-hop pseudowire. Therefore, a conventional VPN transmission may traverse many core networks, each operating as an autonomous system (AS) and having a set of ingress and egress PE routers. Accordingly, switching operations tend to become numerous and complex. Such a pseudowire (PW) is therefore utilized to transfer data across the PSN. As indicated above, the pseudowire is a mechanism that emulates attributes of a service such as Asynchronous Transfer Mode (ATM), Frame Relay (FR), Point-to-Point Protocol (PPP), High Level Data Link Control (HDLC), Synchronous Optical Network (SONET) Frames or Ethernet over a PSN. The functions provided by the PW include encapsulating Protocol Data Units (PDUs) arriving at an ingress port, carrying them across a path or tunnel, managing their timing and order, and any other operations required to emulate the behavior and characteristics of the particular service. In a particular embodiment, PWs are used to carry ingress layer-2 traffic from an ingress PE router to an egress PE router, and then forward the layer-2 traffic out of an egress port of the egress PE router.

A typical pseudowire, therefore, defines two endpoints at the respective provider edge (PE) routers that the pseudowire interconnects. Conventional pseudowire connections, as with typical packet switched based connections, maintain counts of packets transmitted and received. However, conventional mechanisms maintain only counts at the particular endpoint.

Further, no analysis or diagnosis of the packet counts or other attributes is performed. Accordingly, configurations herein are based, in part, on the observation that conventional pseudowire traffic monitoring does not process or diagnose the performance attributes and aggregate counts from both endpoints of a particular pseudowire.

Accordingly, configurations discussed herein substantially overcome such aspects of conventional path analysis by providing a system and method for aggregating performance characteristics for pseudowires to allow computation of message traffic performance over each of the available candidate paths through the core for identifying an optimal core network path. Particular network traffic, or messages, include attributes indicative of performance, such as transport time, delay, jitter, and drop percentage over individual hops along the candidate path. The diagnostic processor parses these messages to identify the attributes corresponding to performance, and analyzes the resulting parsed routing information to compute an expected performance, such as available bandwidth (e.g. transport rate) over the entire pseudowire. Messages including such attributes may include link state attribute (LSA) messages, diagnostic probe messages specifically targeted to enumerate such attributes, or other network suitable network traffic. In a particular configuration, the messages may include Path Verification Protocol (PVP) messages, discussed further in copending U.S. patent application Ser. No. 11/001,149, filed Dec. 1, 2004, entitled "SYSTEM AND METHODS FOR DETECTING NETWORK FAILURE", incorporated herein by reference.

In an exemplary arrangement, a particular configuration is operable as follows: pseudowires (PWs) are employed to create an emulated circuit between a pair of "Provider Edge" (PE) routers on a Packet Switched Network (PSN). These circuits may carry Ethernet, frame relay, ATM, etc. LDP and L2TPv3 are two encapsulation methods for creating Pseudowires.

The capability to monitor various operational parameters such as the status of pseudowires within a tunnel (for example, statistics, performance, and up/down state) and provide support functions such as OAM message mapping for native attachment circuit OAM is very desirable. Such support functions require the input of the pseudowire status. Other functions such as segment-to-segment OAM for multi-hop pseudowires (MH-PWs) and the use of mechanisms such as PVP, LSP Ping, VCCV and VCCV-BFD for defect detection and diagnostic implementation are also attractive.

A Path Verification Protocol (PVP), or connectivity protocol, discussed further in the copending application Ser. No. 11/135,253 cited above, possesses a general construct of a probe mechanism for a specific routing path verification that can be segment-segment (e.g. PE-PE, CE-PE and so forth) and/or end-to-end (CE-CE). A further aspect of MPLS core path verification employs an LSP Ping operation, and is disclosed in further detail in copending U.S. patent application Ser. No. 11/072,082, filed Mar. 4, 2005, entitled "SYSTEM AND METHODS FOR NETWORK REACHABILITY DETECTION". More specifically, the connectivity protocol provides a mechanism that allows different segments to act as proxies for other segments in order to allow for complete end-to-end path measurements. However, it would be beneficial to extend the connectivity protocol in a manner suited to pseudowire status and health. Configurations disclosed herein extend such a mechanism for pseudowires and multi-hop pseudowires.

Further, as defined in RFC 3985, Pseudo Wire Emulation Edge-to-Edge (PWE3) Architecture, a pseudowire is a mechanism that emulates the essential attributes of a telecommunications service (such as a T1 leased line or Frame Relay circuit) over a packet switched network (PSN). The above cited PWE3 (pseudowire) architecture is intended to provide only the minimum necessary functionality to emulate the wire with the required degree of faithfulness for the given service definition. Any required switching functionality is the responsibility of the forwarder function (FWRD). Any translation or other operation needing the knowledge of the payload semantics is carried out by the native service processing (NSP) elements. Configurations herein further extend the PWE3 point-to-point pseudowire architecture by presenting a framework in which multiple pseudowires can be connected to form a uniform path; in effect stitching PWs together, thus extending the node hop diagnostic capabilities of the above cited connectivity protocol application to provide for testing the path of multi-hop PWs.

To incorporate the embodiment of pseudowires, the connectivity protocol processor (i.e. pseudowire manager) function at the initiating device retains attributes such as the virtual circuit type, VCID number (local significance) and an IP address of the pseudowire endpoint (e.g. a loopback address at the remote PE router).

Identification and computation of pseudowire health and connectivity occurs as follows:

1) Upon detection of a pseudowire malfunction e.g. via VCCV (LSP ping mode or BFD mode); the connectivity protocol initiator may either proceed with a path verification for that PW, or it may bundle the check along with other failing PWs that terminate at the same endpoint; therefore, verification may be on a per-VC or per-PSN tunnel basis (where PSN tunnel refers to *all* pw's carried across a given LSP between two PW PE router endpoints).

2) A connectivity protocol initiator checks to see whether the failing PW is single-hop or multi-hop.

3) If the failing PW is single-hop and a path verification is required per-bundle then the connectivity protocol mechanism performs a look-up of its configured VCs and VC types that are terminated at the IP address of the egress PE and identifies the associated tunnel D. It then builds a path verification message with semantics indicating that *all* vc's should be checked. If the failing PW is multi-hop then the path verification is built based on directing the message to the first switching point for the MH-PW and the connectivity protocol messages are sent to that switching point. In practice, this can be performed by setting a bit in the PWE3 header to indicate "MH OAM" and a Time to Live (TTL) value of 1, which will cause the PW message to expire at the first stitch point. Messages can be directed N hops away based on messaging the TTL value to numbers greater than 1, and can target the final hop (or the entire path) by simply setting it to 256 (which is the maximum value).

4) If the failing PW is single-hop and a path verification is required per-vc then the connectivity protocol mechanism proceeds to perform a PW path verification. If the failing PW is multi-hop then the path verification is built based on the first switching point for the MH-PW and the connectivity protocol messages are sent to that switching point.

5) The PW path verification is first performed uni-directional PE-1 to PE-2 (or PE-1 to first switching point); and then bi-directional PE-2 to PE-1 (or PE-1 to first switching point) in so-called "test initiator" mode. This mode essentially asks the receiver "can you see pseudowire x or VCy?". If there is a positive response from PE-2 (or the first switching point) then "No problem found" is issued from PE-2 (or the first switching point). In the case where the PW is multi-hop then the first switching point is responsible for connectivity protocol verification of its particular segment of the end-to-end PW. PE-1 should initiate a further VCCV check for the "non-failing" vc, or simply assume that the vc is operational.

5) If a problem is found, e.g., "no path found" is returned by PE-2 (or the first switching point) or no response is received for the connectivity protocol query within a set time, then a connectivity protocol state machine will report an error to the operator so that appropriate recovery action can be taken.

The above described verification is not limited to connectivity verification and may also include path quality computation. In this later case, the initiator by means of an extended connectivity protocol message will also have the ability to request the collection of various path quality criterion such as delay, packet loss, and so on. Replies can be provided in the form of absolute figures or computed averaged. Therefore, such configurations provide additional machinery for the connectivity protocol so as to perform verification checks (connectivity verification) of Pseudowires and multi-hop pseudowires (connectivity verification or tracing of stitch points).

Configurations herein therefore substantially overcome the above described shortcomings by providing a mechanism for verification of a pseudowire path, and the verification of the path taken by multi-hop pseudowires as well as tracing that path using a generic protocol that allows for complete and arbitrary end-to-end diagnostic control of those paths.

FIG. 1 is a context diagram depicting a networking communications environment 100 including pseudowires operable according to configurations herein. Referring to FIG. 1, the environment 100 includes a core network 110, or service provider network, and a plurality of customer networks 120-1 ... 120-4 (120 generally) connected via the core network 110. Each of the customer networks 120, which may be, for example, VPNs, LANs, intranets or other interconnection operable for providing services from the core network 110, connects to a plurality of end user devices 130-1 ... 130-3 (130 generally), such as desktops, laptops, cell phones, digital voice phones or other personal communications device. The customer networks 120 connect to the core network 110 via a customer edge router 140-1 ... 140-4 (140 generally). The customer edge routers 140 connect to the core via a provider edge router 150-1 ... 150-3 (150 generally). The core network 110 includes a plurality of interconnected forwarding entities (FEs) 160-1 ... 160-3 (160 generally), such as other routers, bridges, gateways and other connectivity devices operable for transport and switching message traffic. Each of the interconnections between the forwarding entities 160 defines a node hop 162-1 ... 162-5 (162 generally) for transporting message traffic between the forwarding entities 160 (typically routers). A pseudowire 170-1 ... 170-2 (170 generally) interconnects a series of forwarding entities 160 between provider edge routers 150 spanning the core network 110 (and may also interconnect any subset of the path between FEs, CEs, PEs, or other routing device).

Each of the pseudowires 170, therefore, represents a logical connection spanning multiple physical node hops that is selectable from a single routing decision at on originator PE (150-1) to a destination PE (150-2), for example, which determines the path through the intermediate node hops 162-1, 162-2, 162-3, such as via label switched paths (LSP) or other transport mechanism. In this manner, the pseudowires 170 raise the level of switching granularity to paths through the core network, rather than individual node hops 162 requiring individual switching decisions to be made at each intermediate node hop 162. In other words, once the PE 150 performs a routing decision to employ a particular pseudowire 170 for transport, the message traffic 170-1, 170-2 travels across the intermediate node hops 162 via the layer 2 tunneling mechanism discussed above, without requiring intermediate routing decisions at each intermediate FE 160.

Figure 2:
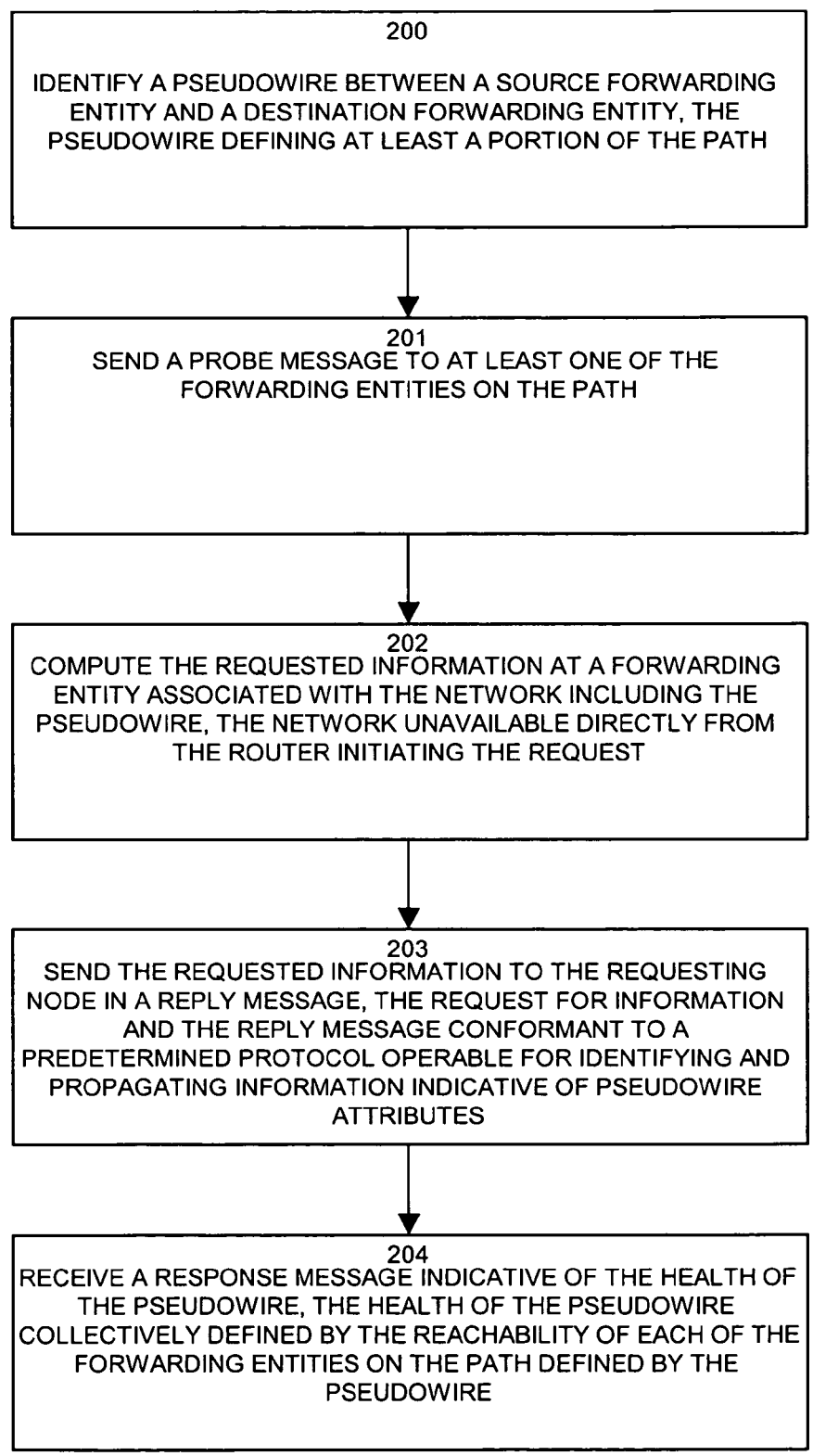
FIG. 2 is a flowchart of path verification in the network of FIG. 1.

FIG. 2 is a flowchart of path verification in the network of FIG. 1. Referring to FIGS. 1 and 2, in a network having a plurality of forwarding entities 160 operable to transmit message traffic from a particular forwarding entity to another forwarding entity via a path including at least one additional forwarding entity, at step 200, an exemplary method of classifying paths includes identifying a pseudowire 170 between a source forwarding entity 150-1 and a destination forwarding entity 150-2, such that the pseudowire 170 defines at least a portion of the path. At step 201, a requesting node configured according to principles defined herein sends a probe message 174 to at least one of the forwarding entities 150, 160 on the path. The forwarding entities 160 include customer edge (CE) routers 140, provider edge (PE) routers 150, and other intermediate switching devices collectively labeled as forwarding entities (FE)s, such as routers, bridges and gateways operable to perform packet switching operations based on a recognized protocol.

Upon transporting the probe message 174, the method computes the requested information at the receiving forwarding entity 150-1 associated with the network 110 including the pseudowire 170, as depicted at step 202, in which the network 110 is unavailable directly from the router 140-1 initiating the request. As indicated above, pseudowire 170 availability and connectivity information is often unavailable directly to a forwarding entity 160 operable to employ the information in routing decisions. Accordingly, the receiving forwarding entity PE-1 (150-1) is operable as a proxy to gather and/or compute the pseudowire status information sought.

The receiving forwarding entity 150-1 sends the requested information to the requesting node 140-1 in a reply message 176, as depicted at step 203, such that the request for information 174 and the reply message 176 conform to a predetermined protocol operable for identifying and propagating information indicative of pseudowire 170 attributes. In the exemplary configurations, the information includes the status of pseudowires 170-1 and 170-2, both interconnecting PE-1 and PE-2 (150-1 and 150-2, respectively). The requesting node 140-1 then receives the response message 176 indicative of the health of the pseudowire 170-1, 170-2, in which the health of the pseudowire is collectively defined by the reachability of each of the forwarding entities 160 on the path defined by the pseudowire, as disclosed at step 204.

Figure 3:
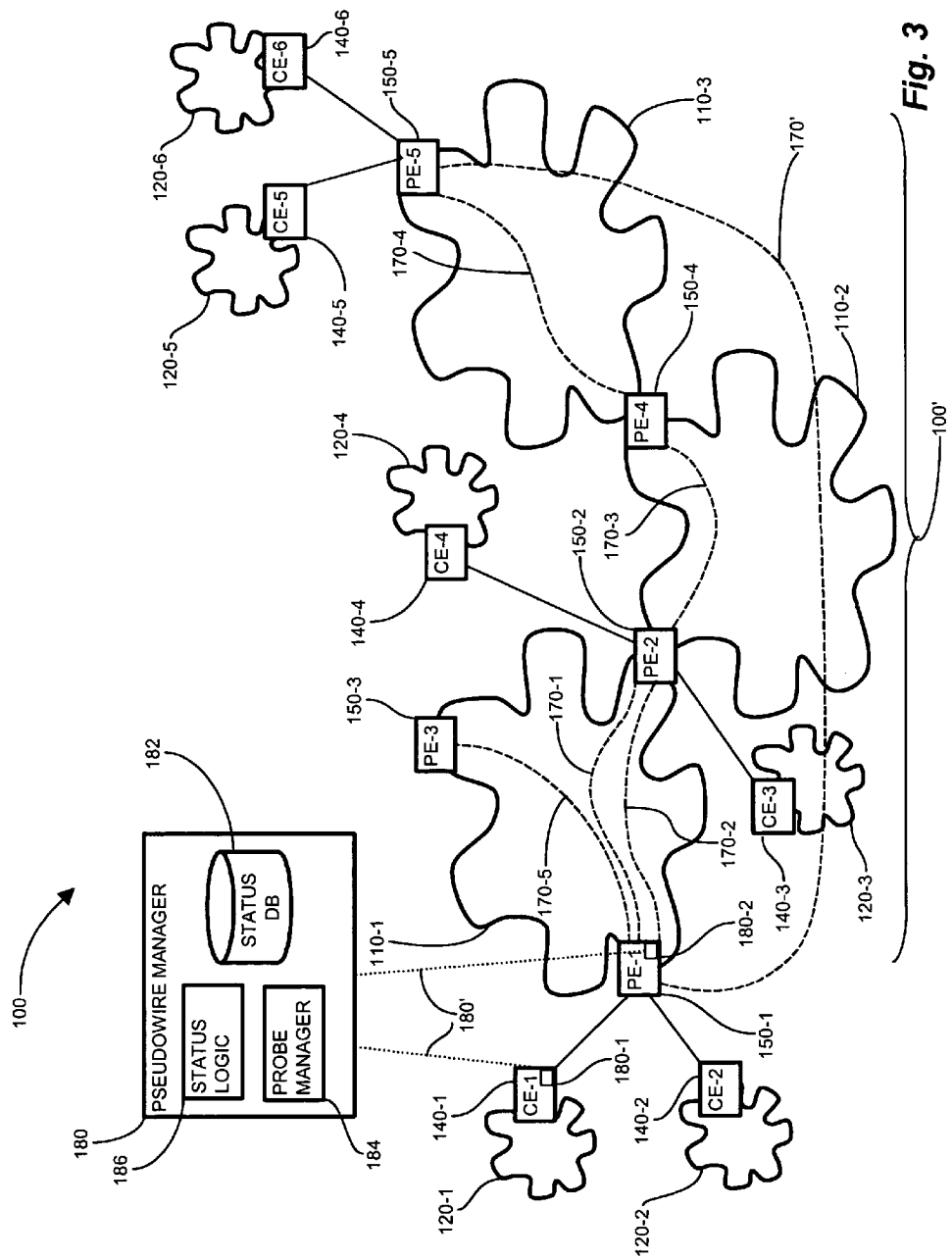
FIG. 3 is a multi-hop network having forwarding entities employing path verification with a multi hop (multi segment) pseudowire.
Figure 4:
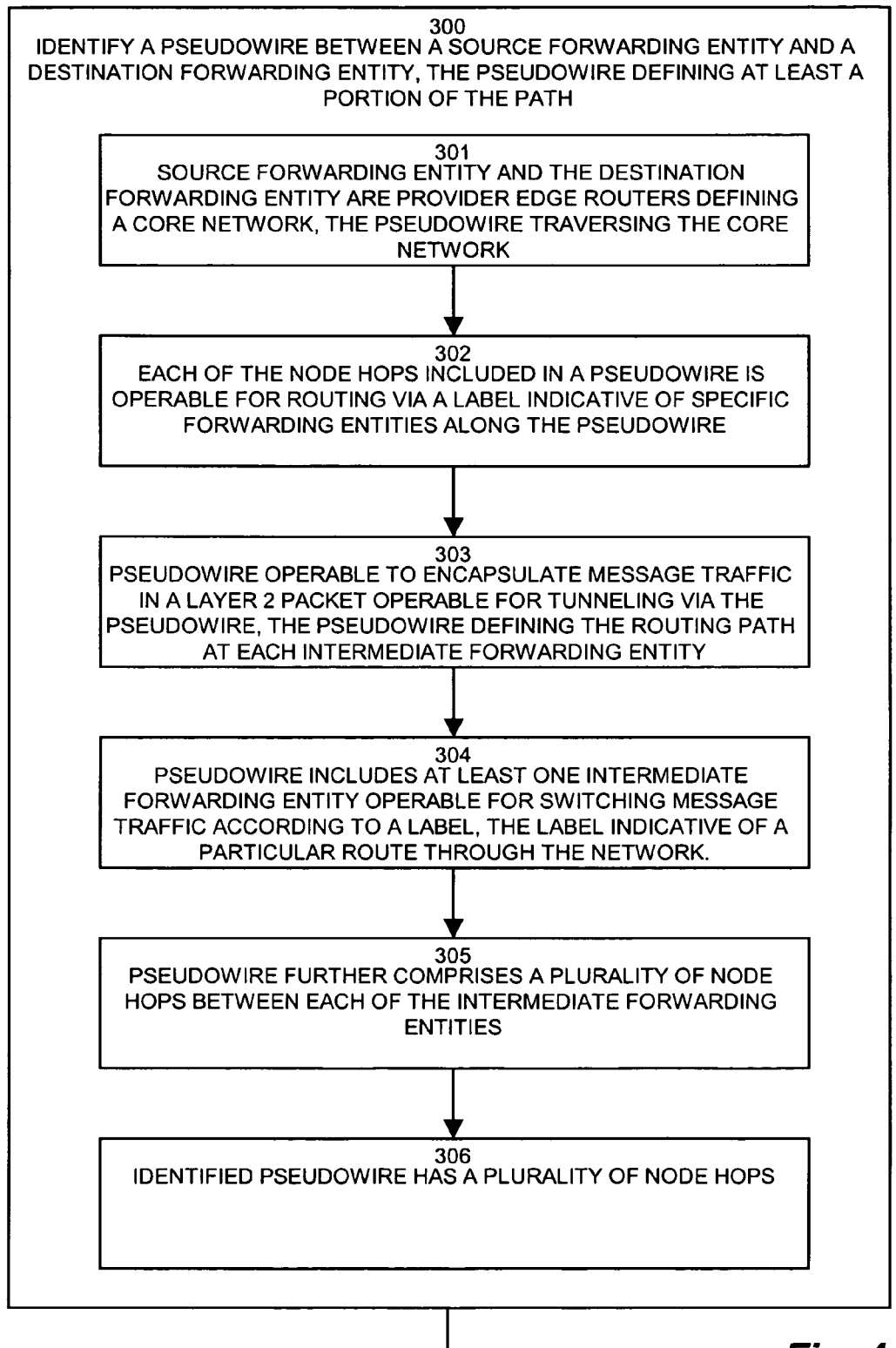
FIGS. 4-7 are a flowchart of multihop pseudowire path verification in the network of FIG. 3.
Figure 5:
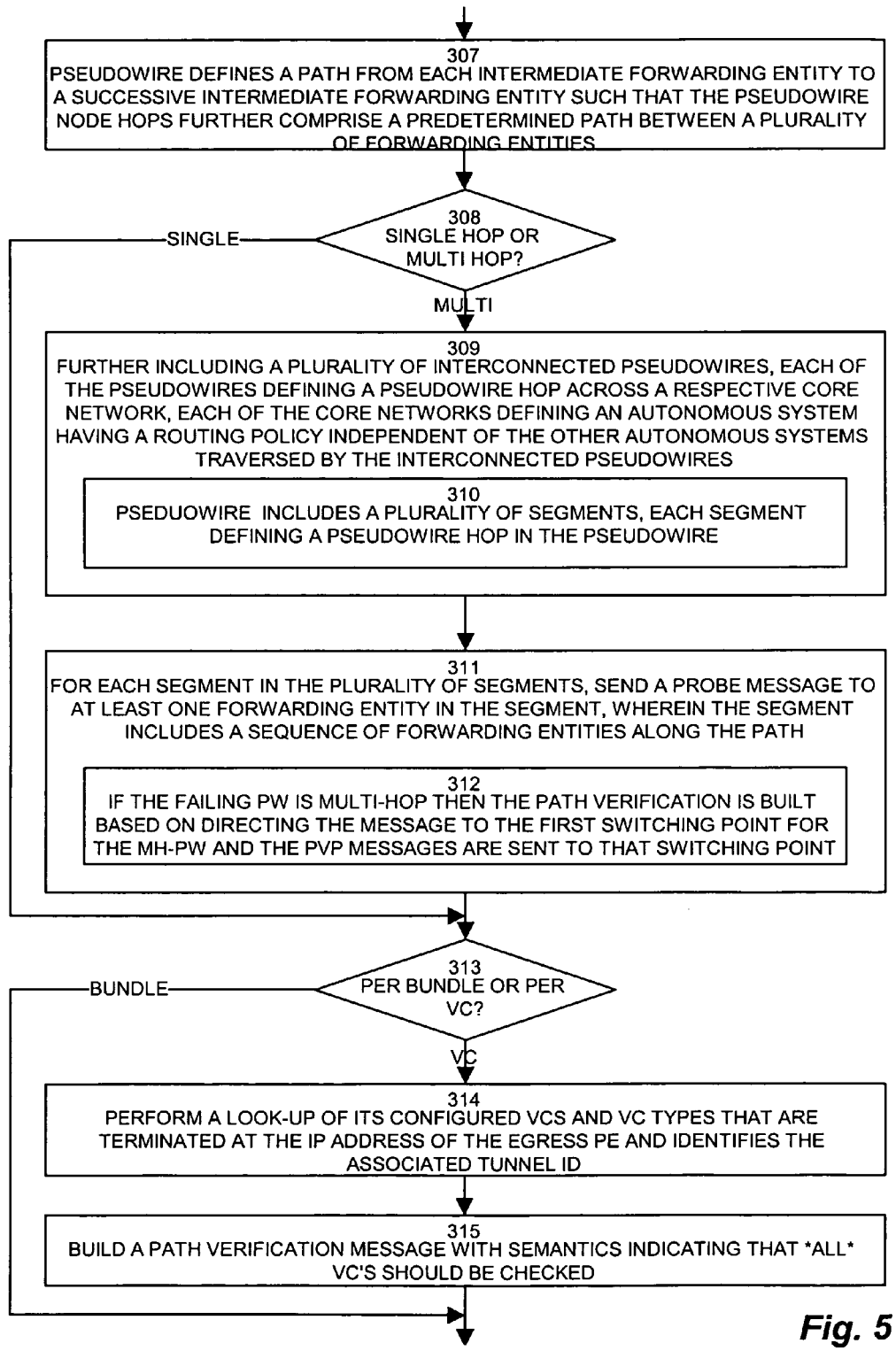
Figure 6:
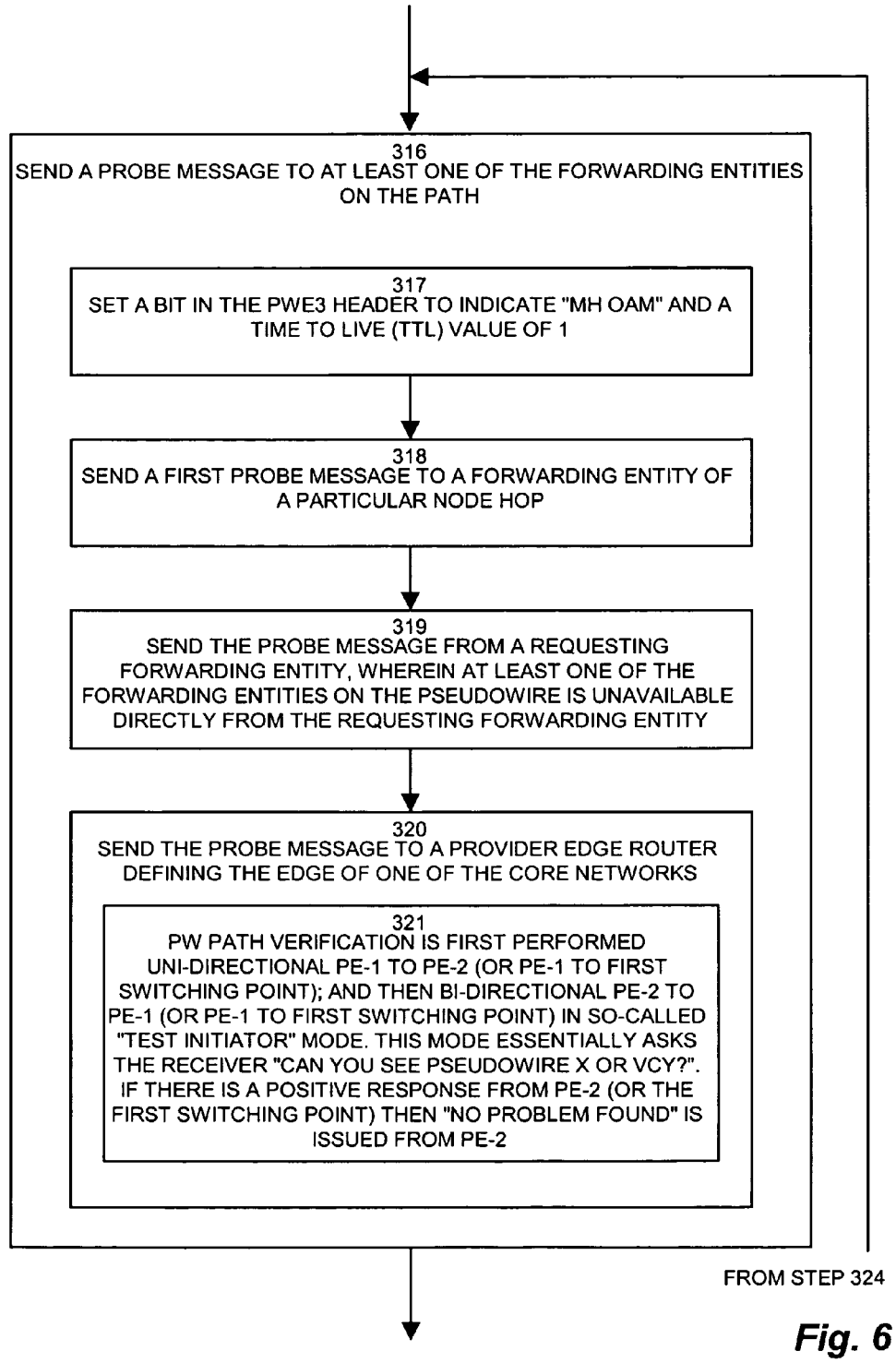
Figure 7:
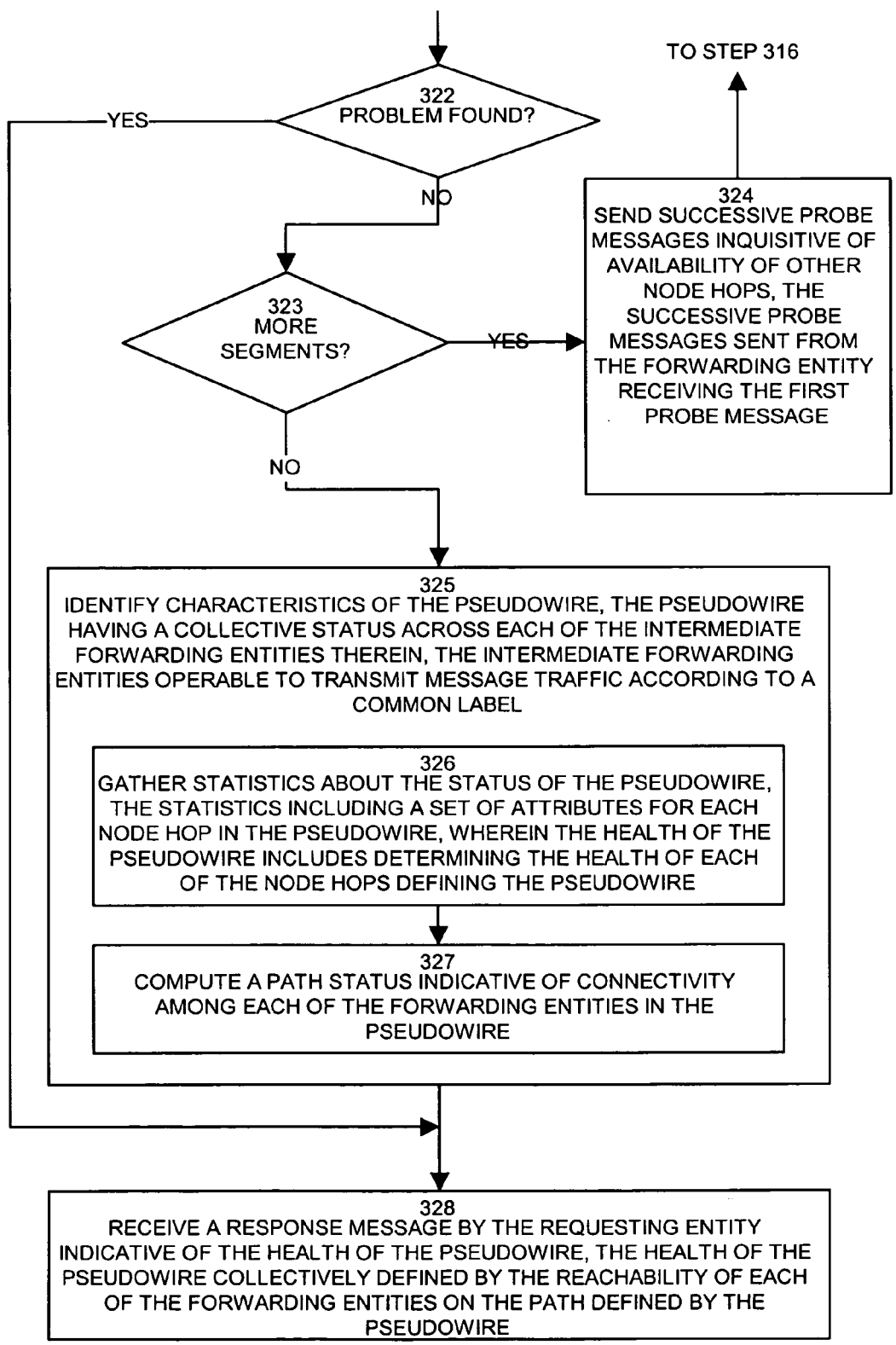

FIG. 3 is a multi-hop network having forwarding entities employing path verification with a multi hop (multi segment) pseudowire. Referring to FIGS. 1-3, the service provider network 100' includes core network segments 110-1, 110-2 and 110-3 interconnected by PE routers PE-2 and PE-4. Network segments typically represent different portions of the network under difference service providers and operated as an autonomous system (AS), meaning that it has an independent routing policy. In the exemplary configuration shown, pseudowires 170-3 and 170-4 complete the path from PE-1 (110-1) to PE-5 (110-3), defining a multihop pseudowire on a path between users 130-1 and 130-3.

The multihop pseudowire 170' includes stitching points at PE routers 150-2 and 150-4, effectively concatenating individual pseudowire hops 170-1, 170-3 and 170-4 across each of the networks 110-1, 110-2 and 110-3. As will be illustrated further below, multiple pseudowires 170 may be candidates for a multihop pseudowire, such as 170-1 and 170-2. Either pseudowire 170-1 and 170-2 is operable for transport between PE-1 and PE-2. Configurations herein address the relative pseudowire health and connectivity of pseudowires 170-1 and 170-2, which depends on the intermediate nodes FE-1, FE-2 and FE-3. Accordingly, PE-1 may employ such information in making routing decisions between either pseudowire 170-1 or 170-2.

Configurations disclosed herein perform pseudowire health and connectivity monitoring from a pseudowire manager 180-1 . . . 180-2 (180 generally). The Pseudowire manager 180 includes a pseudowire database (DB) 182, for storing information about individual pseudowires and node hops, a probe manger 184 for sending individual probe messages inquisitive about specific connectivity, and status logic 186 for determining and computing connectivity based on performance (speed, bandwidth) of individual node hops and pseudowires 170. As indicated above, pseudowire 170 performance is affected by the slowest intervening node hop. Therefore, the status logic 186 computes collective pseudowire 170 performance based on aggregate performance of the intervening forwarding entities 160. The pseudowire manager 180 is typically configured in intermediate PE, CE and FE devices along the pseudowire path 110' to be monitored, as shown by dotted lines 180'. Alternatively, particular components of the pseudowire manager may be configured in intermediate nodes 140, 150 and 160. For example, an intermediate PE or FE may employ only a probe manager 184 for interrogating a particular segment of pseudowire health, and may send response messages 176 back to an originating CE requesting pseudowire health and connectivity verification. Other configurations may be envisioned.

FIGS. 4-7 are a flowchart of multihop pseudowire path verification in the network of FIG. 3. Referring to FIGS. 1 and 3-7, the method of classifying paths includes, at step 300, identifying one or more pseudowires 170 between a source forwarding entity 150-1 and a destination forwarding entity 150-5, the pseudowire defining at least a portion of the path 170'. In the exemplary configuration show, the source forwarding entity 150-1 and the destination forwarding entity 150-5 are provider edge (PE) routers defining the core network 100', as depicted at step 301. Each of the node hops 170-1, 170-3 and 170-4 included in the pseudowire 170' is operable for routing via a label indicative of specific forwarding entities along the pseudowire 170' as depicted at step 301. The individual node hops between intermediate forwarding entities 160 are handled by LSP routing techniques or other mechanism operable to specify the routing path in addition to the destination. Such routing includes, in the exemplary arrangement, encapsulating message traffic in a layer 2 packet operable for tunneling via the pseudowires 170, such that the pseudowire defines the routing path 170' at each intermediate forwarding entity 150, 160, 170, as depicted at step 303. Note that the provider edge and customer edge routers 150, 140 are also operable as forwarding entities 160 to perform routing decisions.

Each pseudowire 170 also includes at least one intermediate forwarding entity 160 operable for switching message traffic according to a label (i.e. LSP label), such that label is indicative of a particular route through the network 100, as depicted at step 304. Accordingly, each pseudowire 170 further comprises a plurality of node hops 162 between each of the intermediate forwarding entities 160, as disclosed at step 305. Identifying pseudowires 170 for interrogation includes identifying a pseudowire 170 having a plurality of node hops 162, as shown at step 306. Therefore, each pseudowire 170 selected for status defines a path from each intermediate forwarding entity 160 to a successive intermediate forwarding entity 160 such that the pseudowire node hops 162 further comprise a predetermined path 100' between a plurality of forwarding entities 150-1, 150-5, as depicted at step 307.

A check is performed, at step 308, to determine if the pseudowire 170 is single hop or multi hop (multi segment). Accordingly in a multi-hop pseudowire 170, the multi-hop pseudowire 170' includes a plurality of interconnected pseudowires 170-1, 170-3 and 170-4, each of the pseudowires 170 defining a pseudowire hop across a respective core network 110, such that each of the core networks 110 defines an autonomous system having a routing policy independent of the other autonomous systems traversed by the interconnected pseudowires 170. In the exemplary scenario, each segment 110 of the collective core network 110' represents a particular service provider. The multi-hop pseudowire 170' includes a plurality of network segments 110, such that each segment 110 defines a pseudowire hop 170-N in the pseudowire 170', as depicted at step 310. As shown in FIG. 3, particular PE routers 150-2, 150-4 provide stitch points for linking or concatenating the individual pseudowire segments 170-2, 170-3, 170-4.

To obtain the connectivity and status information, for each segment in the plurality of segments, the pseudowire manager 180 invokes the probe manager 184 to send a probe message 174 to at least one forwarding entity 160 in the segment 110, in which the segment 110 includes a sequence of forwarding entities 160 along the path of the pseudowire 170', as depicted at step 311. Depending on the status desired and the number of candidate pseudowires 170, the probe manager 184 may send additional probe messages 174 for ascertaining connectivity between individual forwarding entities 160, similar to the mechanism described in the copending path verification patent application cited above. If the failing pseudowire 170 is multi-hop, then the path verification message is built based on directing the message to the first switching point 150-1 for the multi-hop pseudowire 170' and the probe messages 174 are sent to that switching point 150-1, as depicted at step 312. The status logic 186 computes the generation and sequence of probe messages 174 based on the configuration.

Continuing on from step 308, also in the case of a single hop pseudowire 170, a further check is performed to determine if the pseudowire information is gathered per pseudowire bundle or virtual connection (VC), as shown at step 313. Pseudowires are often bundled to identify a plurality of pseudowires terminating at a common point, typically a PE router 150. Alternatively, pseudowires are denoted by the virtual connection (VC) they provide between a source and destination endpoint, i.e. 150-1 and 150-5, in the exemplary configuration shown in FIG. 3, for PE-1 to PE-5 via the VC denoted by 170.' Accordingly in the case of VC based interrogation, the pseudowire manager 180 performs a look-up of its configured VCs and VC types that are terminated at the IP address of the egress PE and identifies an associated tunnel ID, as depicted at step 314. The probe manager 184 then builds a path verification probe message 174 with semantics indicating that each VC should be checked for the egress PE 150-1 (PE-1), as depicted at step 315.

Upon computing the types and destinations of probe messages 174 to send, the status logic 186 invokes the probe manager to send a probe message to at least one of the forwarding entities 140, 150, 160, on the path (recall that CE and PE routers are also forwarding entities for purposes of making routing decisions), as depicted at step 316. Depending on the strategy selected by the status logic 186, sending the probes may include the following. At step 317, the probe manager 184 sets a bit in the PWE3 header to indicate "MH OAM" and a Time to Live (TTL) value of 1, thus ensuring the probe travels only a single hop. The probe manger 184 may send a first probe message 174 to a forwarding entity 160 of a particular node hop 162, as depicted at step 318, and may send successive probes to other FEs 160 on the pseudowire 170. The probe manager 184 may send the initial probe message 174 from a requesting forwarding entity 140-1, in which at least one of the forwarding entities 160 on the pseudowire 170 is unavailable directly from the requesting forwarding entity 140, disclosed at step 319. Typically, CE routers such as CE-1 (140-1) may not be able to interrogate core network routers such as PE 150 and FE 160. Therefore, at step 320, the probe manager 184 sends the probe message to a provider edge 150-1 router defining the edge of one of the core networks 110. In the exemplary configuration, the PW path verification is first performed uni-directional PE-1 to PE-5 (or PE-1 to first switching point); and then bi-directional PE-5 to PE-1 (or PE-1 to first switching point) in so-called "test initiator" mode, as depicted at step 321. Such a mode essentially asks the receiver "can you see pseudowire x or VCy?". If there is a positive response from PE-2 (or the first switching point) then "No problem found" is issued from PE-2.

The status logic 186 performs a check to determine of a problem has been found, as depicted at step 322. If not, then a further check occurs to ascertain if additional segments are to be checked, as shown at step 323. If additional segments (node hops) are to be verified, then the pseudowire manager 180 sends successive probe messages 184 inquisitive of availability of other node hops, in which the successive probe messages 174 are sent from the forwarding entity 150-1 (PE-1) receiving the first probe message, as disclosed at step 324, and control reverts to step 316 for additional probe message 174 sequences.

If no problems are found, then the pseudowire manager 180 builds or augments the status DB 182 by identifying characteristics of the pseudowire 170, such that the pseudowire 170 has a collective status across each of the intermediate forwarding entities 160 therein, in which the intermediate forwarding entities 160 are operable to transmit message traffic according to a common label such as an LSP based transmission, as shown at step 325. Building the status DB includes gathering statistics about the status of the pseudowire 170', including PWs 170-1 . . . 170-4 such the statistics include a set of attributes for each node hop 162 in the pseudowire 170, in which the health of the pseudowire includes determining the health of each of the node hops 162 defining the pseudowire 170, as depicted at step 326. Such attributes may include, for example, virtual circuit type, VCID number (local significance) and an IP address of the pseudowire endpoint (e.g. a loopback address at the remote PE router).

Based on the collective attributes, the status logic 186 computes a path status indicative of connectivity among each of the forwarding entities in the pseudowire 170, as shown at step 327. After determination of whether a problem exists or no problem was found, the requesting entity receives a response message 176 indicative of the health of each of the pseudowires 170, the health of the pseudowire collectively defined by the reachability of each of the forwarding entities 160 on the path defined by the pseudowire 170, 170' (single or multi-hop, respectively).

Those skilled in the art should readily appreciate that the programs and methods classifying pseudowire paths as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for identifying network routing paths has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of classifying paths in a network configured to transmit message traffic, the method comprising:
identifying a pseudowire between a source forwarding entity and a destination forwarding entity, the pseudowire defining a path including at least one intermediate forwarding entity and a plurality of pseudowire segments;
encapsulating message traffic in a layer 2 packet for tunneling via the pseudowire using the plurality of pseudowire segments;
initiating a first probe message sent to the at least one intermediate forwarding entity via a first pseudowire segment of the plurality of pseudowire segments;
initiating at least one successive probe message sent from the at least one intermediate forwarding entity to at least one second pseudowire segment of the plurality of pseudowire segments;
receiving a response message indicative of a health of the pseudowire from the at least one intermediate forwarding entity; and
computing the health of the pseudowire based on a reachability of the at least one intermediate forwarding entity on the path defined by the plurality of pseudowire segments.

2. The method of claim 1 wherein the at least one intermediate forwarding entity is operable for switching message traffic according to a label, the label indicative of a particular route through the network.

3. The method of claim 2 wherein the source forwarding entity and the destination forwarding entity are provider edge routers defining a core network, the pseudowire traversing the core network, the method further comprising:
identifying characteristics of the pseudowire, the pseudowire having a collective status across each of the intermediate forwarding entities therein, the intermediate forwarding entities operable to transmit message traffic according to a common label.

4. The method of claim 3 further comprising sending the first probe message from a requesting forwarding entity, wherein at least one of the plurality of pseudowire segments is unavailable directly from the requesting forwarding entity.

5. The method of claim 1 further comprising identifying a plurality of interconnected pseudowires, each of the interconnected pseudowires defining a pseudowire hop across a respective core network, each of the core networks defining an autonomous system having a routing policy independent of the other autonomous systems traversed by the interconnected pseudowires.

6. The method of claim 5 further comprising sending the first probe message to a provider edge router defining an edge of one of the core networks.

7. The method of claim 1 further comprising gathering statistics about a status of the pseudowire, the statistics including a set of attributes for each pseudowire segment in the pseudowire, wherein the health of the pseudowire includes determining a health of each pseudowire segment defining the pseudowire.

8. The method of claim 7 wherein the pseudowire defines a path from each intermediate forwarding entity to a successive intermediate forwarding entity such that the pseudowire segments further comprise a predetermined path between a plurality of forwarding entities, further comprising computing a path status indicative of connectivity among each of the forwarding entities in the pseudowire.

9. The method of claim 8 wherein each pseudowire segment includes a sequence of forwarding entities along the path.

10. A data communications device for classifying network paths in a network configured to transmit message traffic, the data communications device comprising:
a pseudowire manager configured to identify a pseudowire between a source forwarding entity and a destination forwarding entity, the pseudowire defining a plurality of pseudowire segments, wherein each of the plurality of pseudowire segments includes at least one intermediate forwarding entity, wherein message traffic is encapsulated in a layer 2 packet for tunneling via the pseudowire;
a probe manager in the pseudowire manager configured to send probe messages to the at least one intermediate forwarding entity on each of the plurality of pseudowire segments; and
a status controller responsive to a response message indicative of a health of the pseudowire, the response message being received from the at least one intermediate forwarding entity, wherein the health of the pseudowire is defined by a reachability of the at least one intermediate forwarding entity on the path defined by the pseudowire.

11. The device of claim 10 wherein at least one intermediate forwarding entity on each of the plurality of pseudowire segments is configured to switch message traffic according to a label, the label indicative of a particular route through the network.

12. The device of claim 11 wherein the source forwarding entity and the destination forwarding entity are provider edge routers defining a core network, the pseudowire traversing the core network, the status controller further operable to:
identify characteristics of the pseudowire, the pseudowire having a collective status across each of the intermediate forwarding entities therein, the intermediate forwarding entities operable to transmit message traffic according to a common label.

13. The device of claim 12 wherein the probe manager is operable to send the probe messages from a requesting forwarding entity, wherein at least one of the forwarding entities on the pseudowire is unavailable directly from the requesting forwarding entity.

14. The device of claim 10 wherein the pseudowire manager is further operable to identify interconnected pseudowires, each of the pseudowires defining a pseudowire hop across a respective core network, each of the core networks defining an autonomous system having a routing policy independent of the other autonomous systems traversed by the interconnected pseudowires.

15. The device of claim 14 wherein the plurality of pseudowire segments further comprises a plurality of node hops between each of the intermediate forwarding entities, wherein the pseudowire manager is further operable to identify a pseudowire having the plurality of node hops and the probe manager is configured to send a first probe message to a forwarding entity of a particular node hop.

16. The device of claim 15 wherein the status controller is operable to gather statistics about a status of the pseudowire, the statistics including a set of attributes for each node hop in the pseudowire, wherein the health of the pseudowire includes determining a health of each of the node hops defining the pseudowire.

17. The device of claim 16 wherein each segment of the plurality of pseudowire segments define a node hop in the pseudowire, each of the node hops included in a pseudowire being operable for routing via a label indicative of specific forwarding entities along the pseudowire, the pseudowire defining the path at each intermediate forwarding entity, the probe manager further operable to, for each segment in the plurality of pseudowire segments, send a probe message to at least one forwarding entity in the segment, wherein the segment includes a sequence of forwarding entities along the path.

18. A computer program product having a non-transitory computer readable medium operable to store computer program code encoded thereon for, in a network having a plurality of forwarding entities configured to transmit message traffic from a particular forwarding entity to another forwarding entity via a path including at least one additional forwarding entity, classifying paths, comprising:
computer program code for identifying a pseudowire between a source forwarding entity and a destination forwarding entity, the pseudowire including a plurality of pseudowire segments defining the path including an intermediate forwarding entity, wherein message traffic is encapsulated in a layer 2 packet for tunneling via the pseudowire;
computer program code for sending a probe message to at least one intermediate forwarding entity on the path, sending further comprising sending the probe message from a requesting forwarding entity, wherein at least one of the plurality of forwarding entities on the pseudowire is unavailable directly from the requesting forwarding entity; and
computer program code for receiving a response message indicative of a health of the pseudowire from the at least one of the plurality of forwarding entities that computes the health of the pseudowire, the health of the pseudowire collectively defined by a reachability of each of the forwarding entities on the path defined by the pseudowire, the pseudowire further comprising a plurality of interconnected pseudowires, each of the pseudowires defining a pseudowire hop across a respective core network, each of the core networks defining an autonomous system having a routing policy independent of the other autonomous systems traversed by the interconnected pseudowires.

19. A method comprising:
identifying a pseudowire comprising a plurality of pseudowire segments between a source forwarding entity and a destination forwarding entity;
identifying a plurality of intermediate forwarding entities on each of the plurality of pseudowire segments;
sending a probe message to the at least one of the plurality of intermediate forwarding entities on each of the plurality of pseudowire segments;

gathering, by a device, statistics about a status of the pseudowire from the intermediate forwarding entities that compute a health of the pseudowire, the statistics including a set of attributes for each of the plurality of pseudowire segments in the pseudowire, wherein the health of the pseudowire includes determining a health of each of the pseudowire segments defining the pseudowire; and receiving a response message indicative of an overall health of the pseudowire, the health of the pseudowire collectively defined by a reachability, speed, and bandwidth of each of the intermediate forwarding entities on the path defined by the pseudowire, the pseudowire configured to encapsulate message traffic in a layer 2 packet configured to tunnel over a packet switched network via the pseudowire, the pseudowire defining a routing path at each of the plurality of intermediate forwarding entities.

20. The method of claim 1, wherein encapsulating message traffic in a layer 2 packet comprising encapsulating message traffic using label distribution protocol (LDP) or layer 2 tunneling protocol version 3 (L2TPv3).

21. The method of claim 1, wherein the pseudowire is configured to enable a native service for emulation over a core network using multiprotocol label switching (MPLS).

22. The method of claim 21, wherein the native service includes asynchronous transfer mode (ATM), frame relay, or Ethernet.

* * * * *